(12) United States Patent
Wang et al.

(10) Patent No.: US 8,937,977 B2
(45) Date of Patent: Jan. 20, 2015

(54) LASER ANTIREFLECTION DEVICE AND LASER APPARATUS COMPRISING SAME

(75) Inventors: Zhiyong Wang, Shanxi (CN); Wenbin Qin, Shanxi (CN); Yinhua Cao, Shanxi (CN); Jingjing Dai, Shanxi (CN); Tingwu Ge, Shanxi (CN)

(73) Assignee: Beijing Luhe Feihong Laser S&T Co., Ltd., Beijing (CN)

( * ) Notice: Subject to any disclaimer, the term of this patent is extended or adjusted under 35 U.S.C. 154(b) by 0 days.

(21) Appl. No.: 13/989,409

(22) PCT Filed: Nov. 26, 2011

(86) PCT No.: PCT/CN2011/082983
§ 371 (c)(1),
(2), (4) Date: May 23, 2013

(87) PCT Pub. No.: WO2012/069017
PCT Pub. Date: May 31, 2012

(65) Prior Publication Data
US 2013/0243016 A1    Sep. 19, 2013

(30) Foreign Application Priority Data

Nov. 26, 2010  (CN) .......................... 2010 1 0559809
Nov. 26, 2010  (CN) .......................... 2010 1 0570924
Dec. 8, 2010   (CN) .......................... 2010 2 0646693

(51) Int. Cl.
*H01S 3/13*     (2006.01)
*H01S 3/00*     (2006.01)
(Continued)

(52) U.S. Cl.
CPC ............ *H01S 3/0064* (2013.01); *B23K 26/0613* (2013.01); *B23K 26/0656* (2013.01); *B23K 26/425* (2013.01); *H01S 3/2383* (2013.01)
USPC .............. 372/29.02; 372/29.021; 372/29.022; 372/29.023; 372/30; 372/31; 372/27; 372/6

(58) Field of Classification Search
CPC ....... H01S 3/1392; H01S 3/13; H01S 3/0064; H01S 3/067
USPC ......... 372/29.02, 29.021, 29.022, 29.023, 30, 372/31, 32, 27, 6
See application file for complete search history.

(56) References Cited

U.S. PATENT DOCUMENTS 5,828,643 A * 10/1998 Takeda et al. ............ 369/112.12
2005/0094146 A1   5/2005 Hunt
2010/0320401 A1* 12/2010 Tsukihara .................. 250/492.1

FOREIGN PATENT DOCUMENTS

CN    2252071 A     4/1997
CN    1162812 A    10/1997
(Continued)

OTHER PUBLICATIONS

International Search Report dated Feb. 23, 2012 for corresponding PCT Application No. PCT/CN2011/082983, 4 pages.
(Continued)

*Primary Examiner* — Kinam Park
(74) *Attorney, Agent, or Firm* — Brundidge & Stanger, P.C.

(57) ABSTRACT

A laser anti-reflection device includes a polarizing beam splitter, a λ/4 wave plate and an absorber disposed in an outgoing light path of a laser emitting linearly polarized light with a wavelength of λ. The linearly polarized light from the laser passes through the polarizing beam splitter and the λ/4 wave plate in turn to become a circularly polarized light beam. Part of the circularly polarized light beam is then reflected by a workpiece to be processed along the original light path and passes the λ/4 wave plate to become a linearly polarized light beam with a polarization direction vertical to that of the outgoing linearly polarized light beam. The vertical polarized beam passes the polarizing beam splitter, deviates from the light path of the outgoing linearly polarized light beam and reaches the absorber. The laser anti-reflection device prevents reflected light from damaging the laser from high power lasers.

21 Claims, 6 Drawing Sheets

(51) Int. Cl.
  *B23K 26/06* (2014.01)
  *B23K 26/30* (2014.01)
  *H01S 3/23* (2006.01)

(56) References Cited

FOREIGN PATENT DOCUMENTS

| CN | 1487264 | A | 4/2004 |
| CN | 201063094 | A | 5/2008 |
| CN | 101493582 | A | 7/2009 |
| CN | 102055127 | A | 5/2011 |
| CN | 102064464 | A | 5/2011 |
| CN | 201946875 | U | 8/2011 |
| CN | 201966481 | U | 9/2013 |

OTHER PUBLICATIONS

First Chinese Office Action, Application No. 201010570924.7.
Second Chinese Office Action, Application No. 201010570924.7.

* cited by examiner

LASER ANTIREFLECTION DEVICE AND LASER APPARATUS COMPRISING SAME

FIELD OF THE INVENTION

The present invention relates to an optical system, particularly to a laser anti-reflection device and a laser apparatus comprising the same. The present invention belongs to the laser technology field.

BACKGROUND

Laser processing is a high and new technology developed rapidly not only for punching, marking, cutting, welding and heat treating, but also for fine machining. Laser processing, so to speak, has been applied in almost all industries, and has shown unique advantages, particularly in non-ferrous metal material processing. Lasers are the core elements of a laser processing system, and largely determine the quality of the laser processing.

At present, lasers used for laser processing include $CO_2$ lasers, Nd:YAG solid lasers, semiconductor lasers, optical fiber lasers and so on. $CO_2$ lasers occupy over 85% market share in the cutting field, they emit laser light with a wavelength of 10.6 μm. Nd:YAG solid lasers emit laser light with a wavelength of 1 μm, which is shorter than that of $CO_2$ lasers, thus the laser light is easier to be absorbed by common metal materials. However, Nd:YAG lasers have a relatively large volume and a limited output power. Semiconductor lasers and optical fiber lasers have a promising application perspective due to their small volume, long lifetime, high efficiency high-quality light beam, simple maintenance and the ability to normally operate in harsh environments such as high temperature, high pressure, high vibration and high impact. Up to now, this type of lasers have been greatly improved in output power and beam quality. For example, optical fiber lasers have now realized a power output on the order of kilowatts.

During the laser processing of a workpiece, when a high energy laser beam reaches the surface of a workpiece with low optical absorptivity or high surface smoothness, the surface of the workpiece may reflect a large amount of laser energy and a part of reflected light might return to the laser along the original light path. In the case of a $CO_2$ laser, the laser reflection may cause the drop of the laser power, the instability of the laser output, the change of the laser mode, and even the damage of the resonant cavity of the $CO_2$ laser, the case of a semiconductor laser, due to the high power density of the laser beam, the reflected light returning to the light emitting chip of the semiconductor laser may generate a large amount of heat in a short time, and thus burn the chip of the semiconductor laser. In the case of an optical fiber laser, the reflected laser light may focus on the end surface of the outgoing optical fiber via the optical system to burn the fiber or even to reach the laser through the fiber, resulting in Q-switching and thus giant pulses output from the laser, all of which might impact the stability of the workpiece processing or damage the optical fiber laser.

In order to ensure the normal operation of the lasers and extend their lifetime, it is desirable to prevent a reflected light from damaging the lasers. At present, laser anti-reflection devices mainly include optical isolators utilizing the Faraday optical rotation effect. However, this type of optical isolator cannot withstand high-power laser irradiation, and can only work for low power lasers. Therefore, it is desired to have an anti-reflection device working for high power lasers (such as lasers with a power of hundreds up to a thousand Watts).

On the other hand, during processing, it is possible to make the processed surface of a workpiece relative to the output end face of the laser by an certain angle (e.g., 10 degrees or so), thereby preventing the reflected light from returning to the laser along the original path. Although this practice can prevent the reflected light from damaging a laser, it limits the application of some processes. Furthermore, a local molten pool formed by the laser on the surface of the workpiece during the processing randomly flows, thus the reflection surface keeps changing randomly, therefore the reflected light may still have a chance to return to the laser and damage it. Furthermore, a method for measuring the reflected light in real time can be used to monitor the reflected light, but it cannot really prevent the reflected light from damaging the laser after all.

SUMMARY

Technical Problem

An object of the present invention is to provide a laser anti-reflection device and a laser apparatus incorporating the same for separating the laser beam returning to said laser along the original path due to workpiece reflection during workpiece processing, thus preventing it from damaging the laser.

Technical Solution

To achieve the above-mentioned object, in an aspect of the present invention, there is provided a laser anti-reflection device, comprising: a polarizing beam splitter, a λ/4 wave plate and an absorber, wherein said polarizing beam splitter and said λ/4 wave plate are configured to be disposed in the outgoing light path of a laser emitting a linearly polarized light beam with a wavelength of λ, such that the linearly polarized light beam exiting from the laser first passes the polarizing beam splitter, then passes the λ/4 wave plate and becomes a circularly polarized light beam, the circularly polarized light beam reaches a workpiece to be processed, a part of the circularly polarized light beam reflected from the workpiece returns along the original light path, passes the λ/4 wave plate and becomes a linearly polarized light beam with a polarization direction perpendicular to that of the outgoing linearly polarized light beam, the linearly polarized light beam deviates from the light path of the outgoing linearly polarized tight beam after it passes the polarizing beam splitter and reaches the absorber.

Preferably, said polarizing beam splitter may be a coated mirror or a prism.

Preferably, said polarizing beam splitter may be a polarizing beam splitter transmitting P linearly polarized light and reflecting S linearly polarized light or a polarizing beam splitter transmitting S linearly polarized light and reflecting P linearly polarized light.

Preferably, said λ/4 wave plate may be a transmissive λ/4 wave plate or a reflective λ/4 wave plate.

Preferably, said absorber may be a perfect absorber for the linearly polarized light beam illuminating thereon with its light absorption surface forming an arbitrary angle with the linearly polarized light beam, or said absorber may be a partial absorber for said linearly polarized light beam illuminating thereon with its light absorption surface forming a non-right angle with the linearly polarized light beam.

In another aspect of the present invention, there is provided a laser apparatus incorporating an anti-reflection device, comprising: a laser and a laser anti-reflection device as mentioned above, wherein said laser anti-reflection device is disposed in the outgoing light path of said laser for separating the laser beam returning to said laser along the original path due to workpiece reflection during workpiece processing.

Preferably, the above mentioned laser apparatus incorporating an anti-reflection device may further comprise: one or more systems of an optical collimation system disposed between said laser and said laser anti-reflection device, an optical focusing system disposed between said laser anti-reflection device and said workpiece to be processed, and at least one reflection or refraction systems disposed between said laser and said workpiece to be processed.

Preferably, said laser may be a $CO_2$ laser.

In the above-mentioned laser apparatus with a $CO_2$ laser, preferably, said polarizing beam splitter may be a coated mirror in which a polarization light splitting film is coated on a ZnSe or GaAs substrate. Further, preferably, said $\lambda/4$ wave plate may be a bronze mirror plated with a $\lambda/4$ retardation film and/or said reflection or refraction system may be a reflective bronze mirror, More preferably, said bronze mirror plated with a $\lambda/4$ retardation film and/or said reflective bronze mirror may be provided with a cooling water pipe.

Preferably, said laser may be a linearly polarized optical fiber laser comprising a linearly polarized optical fiber laser unit and an optical fiber endcap coupled with the output fiber of the linearly polarized optical fiber laser unit.

In the above-mentioned laser apparatus with a linearly polarized optical fiber laser, said linearly polarized optical fiber laser unit may comprise: a semiconductor pumping source with tail fiber, a signal light reflection polarization maintaining optical fiber grating, a polarization maintaining doped fiber, an output coupling polarization maintaining optical fiber grating and a pump light detacher, wherein the tail fiber of said semiconductor pumping source with tail fiber is fused with one end of said signal light reflection polarization maintaining optical fiber grating, the other end of said signal light reflection polarization maintaining optical fiber grating is fused with one end of said polarization maintaining doped fiber, the other end of said polarization maintaining doped fiber is fused with one end of said output coupling polarization maintaining optical fiber grating, the other end of said output coupling polarization maintaining optical fiber grating is fused with one end of said pumping light detacher and the other end of said pumping light detacher forms the output fiber of said linearly polarized optical fiber laser unit.

Further, preferably, said laser may be a polarization maintaining optical fiber laser comprising: a plurality of linearly polarized optical fiber laser units, a polarization maintaining optical fiber combiner, a large core diameter matching polarization maintaining optical fiber and a fiber endcap, wherein the output fibers of said plurality of linearly polarized optical fiber laser units are combined together at one end of the polarization maintaining optical fiber combiner, the other end of the polarization maintaining optical fiber combiner is fused with one end of the large core diameter matching polarization maintaining optical fiber, the other end of the large core diameter matching polarization maintaining optical fiber is coupled with the fiber endcap.

The above-mentioned polarization maintaining optical fiber laser includes a plurality of linearly polarized optical fiber laser units, and each of the linearly polarized optical fiber laser units is separated. Therefore, the damage to an individual linearly polarized optical fiber laser unit can only impose some influence on the total power of the laser output, but will not impose a determinant influence on the output of the whole optical fiber laser. Thus, the above-mentioned polarization maintaining optical fiber laser with the anti-reflection device has high system stability.

Further, preferably, said laser may be a semiconductor laser or an array of semiconductor lasers.

In another aspect of the present invention, e is also provided a laser apparatus incorporating an anti-reflection device, comprising: N lasers, wherein N is a natural number, $N \geq 2$, and the $i^{th}$ laser emits linearly polarized light with a wavelength of $\lambda_i$, i being a natural number, $1 \leq i \leq N$; N aforementioned laser anti-reflection devices, wherein the $i^{th}$ laser anti-reflection device corresponds to the $i^{th}$ laser and is disposed in the outgoing light path of the laser; and at least N−1 beam combiners, wherein the $j^{th}$ beam combiner corresponds to the $j^{th}$ laser, j being a natural number, $2 \leq j \leq N$, the $j^{th}$ beam combiner reflects or refracts light with a wavelength of $\lambda_j$ and transmits light with a wavelength of $\lambda_i$, wherein $1 \leq i < j \leq N$, wherein, the linearly polarized light beams emitted from said N lasers pass their corresponding laser anti-reflection devices, respectively, and then pass their corresponding beam combiners, respectively; before they are combined into one beam of light and reach the workpiece to be processed, wherein if the first laser corresponds to no beam combiner, then the linearly polarized light beam emitted from the first laser passes its corresponding laser anti-reflection device and directly merges into the light beams exiting from other lasers, passing their respective corresponding laser anti-reflection devices and their respective corresponding beam combiners to form one beam of light.

Preferably, the above mentioned laser apparatus incorporating an anti-reflection device may further comprise a first beam combiner corresponding to said first laser and reflecting or refracting light with a wavelength of $\lambda_1$.

Advantageous Effects

In summary, the laser anti-reflection device provided in the present invention can separate the laser beam returning to the laser along the original path due to workpiece reflection during workpiece processing, thereby preventing it from damaging the laser. The laser anti-reflection device is particularly suitable for high power lasers. In addition, a laser apparatus containing the laser anti-reflection device can have high stability and long lifetime.

DETAILED DESCRIPTION

Figure 1:
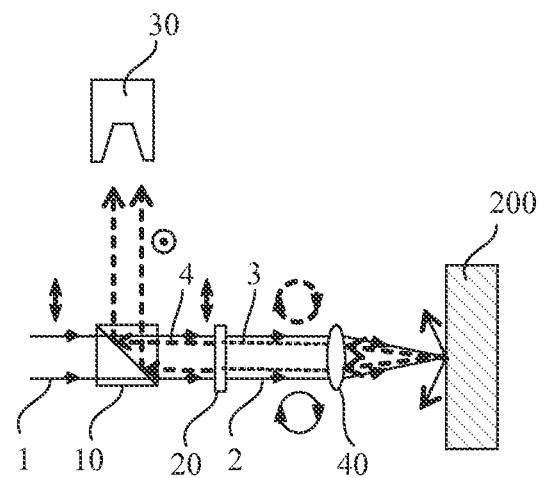
FIG. 1 is a schematic diagram showing the light path structure of a laser anti-reflection device according to the first embodiment of the present invention.

Embodiments of the laser anti-reflection device and the laser apparatus including the same according to the present invention will be described below with reference to accompanying drawings. Those of ordinary skills in the art will appreciate that the described embodiments may be modified in various ways or combinations thereof without departing from the spirit and scope of the present invention. Therefore, the drawings and the description are illustrative in nature, and are not intended to limit the scope of claims. Furthermore, in the description, the drawings are not drawn to scale and the same reference numerals denote the same or similar parts.

Firstly, a laser anti-reflection device according to one aspect of the present invention will be described with reference to FIGS. 1 to 4. Generally, the laser anti-reflection device includes: a polarizing beam splitter, a $\lambda/4$ wave plate and an absorber, wherein said polarizing beam splitter and said $\lambda/4$ wave plate are provided to be disposed in the outgoing light path of a laser emitting a linearly polarized light beam with a wavelength of $\lambda$. The linearly polarized light beam exiting from the laser first passes the polarizing beam splitter, then passes the $\lambda/4$ wave plate and thus becomes a circularly polarized light beam. The circularly polarized light beam reaches a work piece to be processed, and a part of it reflected from the work piece returns along the original light path and passes the $\lambda/4$ wave plate, and thus becomes a linearly polarized light beam with polarization direction perpendicular to that of the outgoing linearly polarized light beam. The linearly polarized light beam deviates from the light path of the outgoing linearly polarized light beam and reaches the absorber after it passes the polarizing beam splitter.

Said polarizing beam splitter may be a coated mirror or prism as far as the structure type is concerned, and may be a polarizing beam splitter transmitting P linearly polarized light and reflecting S linearly polarized light or a polarizing beam splitter transmitting S linearly polarized light and reflecting P linearly polarized light as far as the polarization state is concerned. Said $\lambda/4$ wave plate may be a transmissive $\lambda/4$ wave plate or a reflective $\lambda/4$ wave plate. Said absorber may be a perfect absorber for the linearly polarized light beam illuminating thereon with its light absorption surface forming an arbitrary angle with the linearly polarized light beam, or said absorber may be a partial absorber for said linearly polarized light beam illuminating thereon with its light absorption surface forming a non-right angle with the linearly polarized light beam.

Embodiment 1

FIG. 1 is a schematic diagram showing the light path structure of the laser anti-reflection device according to the first embodiment of the present invention. As shown in FIG. 1, the laser anti-reflection device according to the first embodiment of the present invention includes a polarizing beam splitter 10 and a $\lambda/4$ wave plate 20 disposed in the outgoing light path of a laser emitting a linearly polarized light beam 1 with a wavelength of $\lambda$, and an absorber 30. The linearly polarized light beam 1 is a P linearly polarized light with a polarization state shown in FIG. 1 by a two-way arrow. The polarizing beam splitter 10 is made of a prism and is a polarizing beam splitter transmitting P linearly polarized light and reflecting S linearly polarized light. The $\lambda/4$ wave plate 20 is a transmissive wave plate.

The linearly polarized light beam 1 (P linearly polarized light) exiting from the laser first passes the polarizing beam splitter 10 (still P linearly polarized light now), and then passes the $\lambda/4$ wave plate, thus becomes a circularly polarized light beam 2 with a polarization state shown in FIG. 1 by a solid line circle with arrow. The circularly polarized light beam 2 may be focused by a focusing lens 40 before hitting a workpiece 200 to be processed. Apart of the circularly polarized light beam 3 reflected from the workpiece 200 to be processed (with a polarization state shown in FIG. 1 by a broken line circle with arrow) returns along the original light path and passes the $\lambda/4$ wave plate to become a linearly polarized light beam 4 (S polarized light with a polarization state shown in FIG. 1 by a circle with dot) with a polarization direction perpendicular to that of the exiting linearly polarized light beam 1. Since the polarizing beam splitter 10 is a polarizing beam splitter transmitting P and reflecting S polarized light, the linearly polarized light beam 4 deviates from the light path of the exiting linearly polarized light beam 1 after passing the polarizing beam splitter 10, and reaches the absorber 30, which makes the laser free from damage caused by the reflected light.

Embodiment 2

Figure 2:
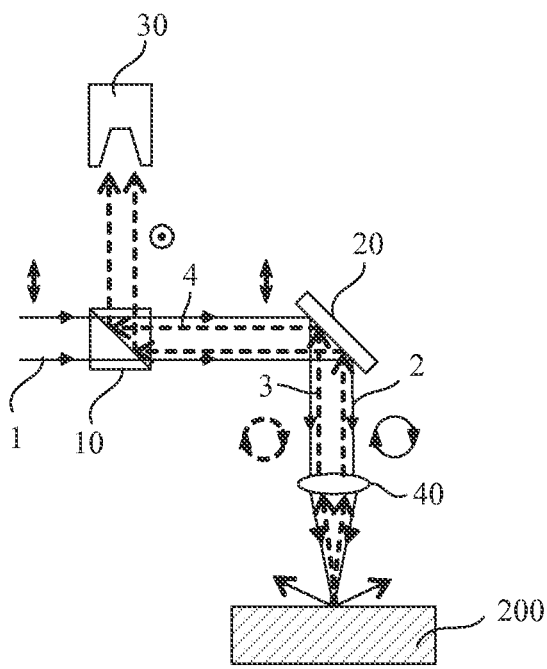
FIG. 2 is a schematic diagram showing the light path structure of a laser anti-reflection device according to the second embodiment of the present invention.

FIG. 2 is a schematic diagram showing the light path structure of the laser anti-reflection device according to the second embodiment of the present invention. As shown in FIG. 2, in this embodiment, the configuration is identical with that in embodiment 1 except that the $\lambda/4$ wave plate 20 is a reflective wave plate, and therefore detail description will be omitted here.

Embodiment 3

Figure 3:
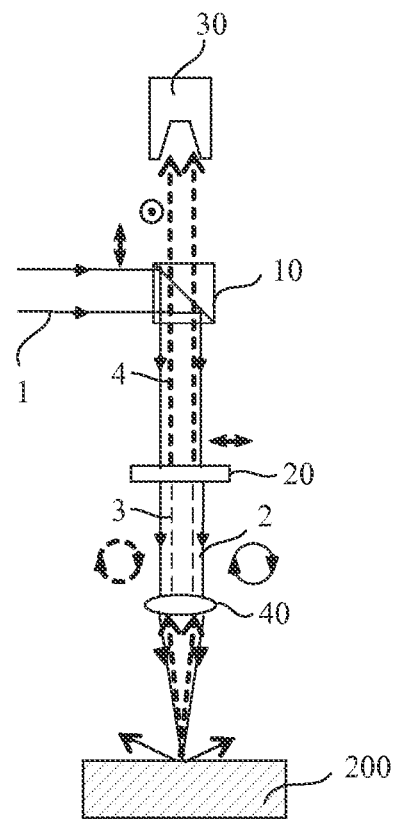
FIG. 3 is a schematic diagram showing the light path structure of a laser anti-reflection device according to the third embodiment of the present invention.

FIG. 3 is a schematic diagram showing the light path structure of the laser anti-reflection device according to the third embodiment of the present invention. As shown in FIG. 3, in this embodiment, the configuration is identical with that in embodiment 1 except that the polarizing beam splitter 10 is a polarizing beam splitter transmitting S and reflecting P linearly polarized light, therefore detail description will be omitted here.

Embodiment 4

Figure 4:
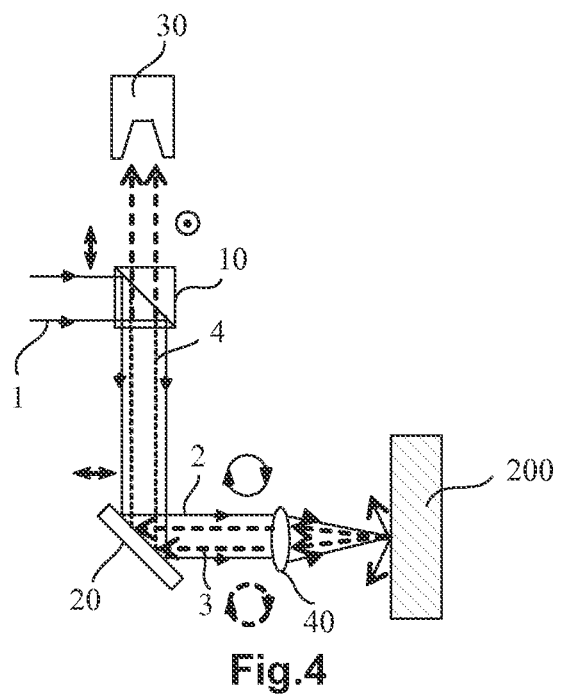
FIG. 4 is a schematic diagram showing the light path structure of a laser anti-reflection device according to the fourth embodiment of the present invention.

FIG. 4 is a schematic diagram showing the light path structure of the laser anti-reflection device according to the fourth embodiment of the present invention. As shown in FIG. 4, in this embodiment, the configuration is identical with that in embodiment 1 except that the polarizing beam splitter 10 is a polarizing beam splitter transmitting S and reflecting P linearly polarized light, and the $\lambda/4$ wave plate 20 is a reflective wave plate, therefore detail description will be omitted here.

The laser apparatus incorporating the anti-reflection device provided in another aspect of the present invention will be described below with reference to FIGS. 5 to 8. Generally, said laser apparatus incorporating the anti-reflection device includes: a laser and the laser anti-reflection device as described above, wherein said laser anti-reflection device is disposed in the outgoing tight path of said laser for separating the laser beam returning to said laser along the original path due to workpiece reflection during workpiece processing.

Of course, the laser apparatus incorporating the anti-reflection device according to the present invention may further include: one or more systems of an optical collimation system disposed between the laser and the laser anti-reflection device, an optical focusing system disposed between the laser anti-reflection device and the workpiece to be processed, and at least one reflection or refraction systems disposed between the laser and the workpiece to be processed. These systems are configured to collimate, focus the light beam and regulate the light path of the light beam to meet practical demands.

Embodiment 5

Figure 5:
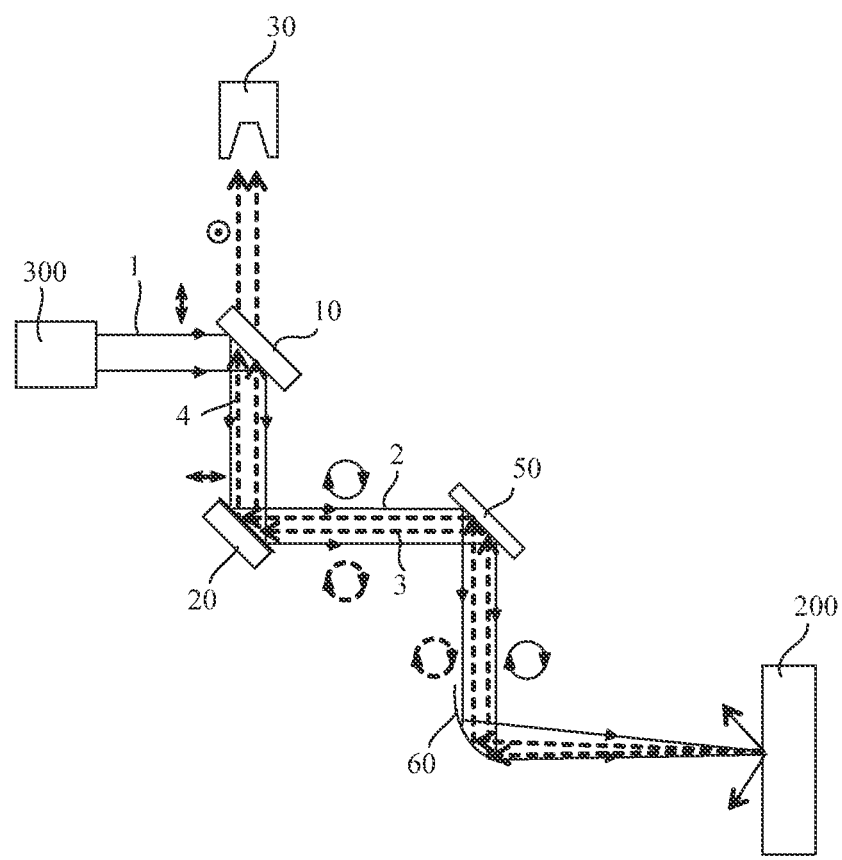
FIG. 5 is a schematic diagram showing the light path structure of a laser apparatus incorporating a laser anti-reflection device according to the fifth embodiment of the present invention.

FIG. 5 is a schematic diagram showing the light path structure of the laser apparatus incorporating the laser anti-reflection device according to the fifth embodiment of the present invention. In this embodiment, the laser apparatus incorporating the laser anti-reflection device includes: a $CO_2$ laser 300 and a laser anti-reflection device as described above disposed in the outgoing light path of the laser.

As shown in FIG. 5, in the above-mentioned laser apparatus with a $CO_2$ laser being the said laser, the polarizing beam splitter 10 in the laser anti-reflection device is made of a coated mirror in which a polarizing beam splitting film is coated on a substrate such as a ZnSe or GaAs substrate, and it is a polarizing beam splitter reflecting P and transmitting S linearly polarized light; and the $\lambda/4$ wave plate 20 is made of a bronze mirror plated with a $\lambda/4$ retardation film, and is a reflective wave plate. In addition, it is further possible to provide a reflective bronze mirror 50 and a reflective focusing mirror 60 between the laser anti-reflection device and the workpiece 200 to regulate the light path and focus the light beam. For cooling the above-mentioned optical elements, it is further possible to provide a cooling water pipe (not shown) on the optical elements such as said bronze mirror 20 plated with a $\lambda/4$ retardation film and/or said reflective bronze mirror 50.

As shown in FIG. 5, the linearly polarized light beam emitted from the $CO_2$ laser 300 passes the anti-reflection device, then passes the light path regulating device (i.e., the reflective bronze mirror 50) and the focusing device (i.e., the reflective focusing mirror 60), and reaches the workpiece 200 to be processed. A part of light reflected from the workpiece 200 and returning along the original light path deviates from the outgoing light path of the laser due to the anti-reflection device, and reaches the absorber 30, which prevents the reflected light from damaging the laser 300. The working principle of said anti-reflection device is described before, and will not be repeated here.

Embodiment 6

Figure 6:
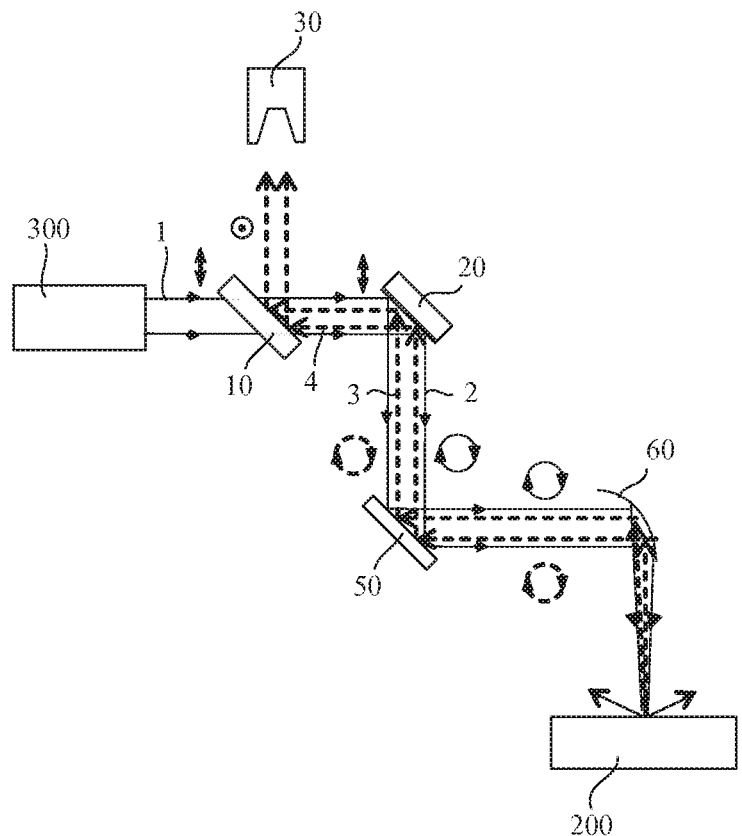
FIG. 6 is a schematic diagram showing the light path structure of a laser apparatus incorporating a laser anti-reflection device according to the sixth embodiment of the present invention.

FIG. 6 is a schematic diagram showing the light path structure of the laser apparatus incorporating the laser anti-reflection device according to the sixth embodiment of the present invention. In this embodiment, the laser apparatus incorporating the laser anti-reflection device includes: a $CO_2$ laser 300 and a laser anti-reflection device as described above disposed in the outgoing light path of said laser. The present embodiment differs from the embodiment 5 in that, in the present embodiment, the polarizing beam splitter 110 is a polarizing beam splitter transmitting P and reflecting S linearly polarized light, other than which the configuration is the same as that in embodiment 5, therefore the detail description will not be provided here.

Embodiment 7

Figure 7:
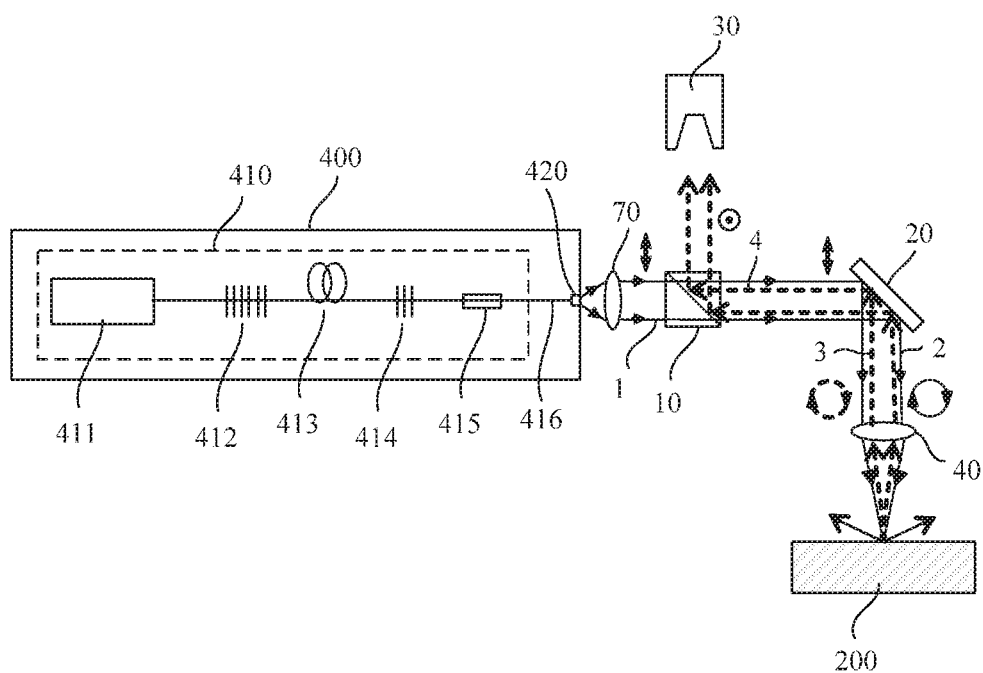
FIG. 7 is a schematic diagram showing the light path structure of a laser apparatus incorporating a laser anti-reflection device according to the seventh embodiment of the present invention.

FIG. 7 is a schematic diagram showing the light path structure of the laser apparatus incorporating the laser anti-reflection device according to the seventh embodiment of the present invention. In this embodiment, the laser apparatus incorporating the laser anti-reflection device includes: a linearly polarized optical fiber laser 400 and a laser anti-reflection device as described above disposed in the outgoing light path of the laser.

As shown in FIG. 7, said linearly polarized optical fiber laser 400 may include a linearly polarized optical fiber laser unit 410 and an fiber endcap 420 coupled with the output fiber 416 of the linearly polarized optical fiber laser unit 410. Said linearly polarized optical fiber laser unit 410 may include: a semiconductor pumping source with tail fiber 411, a signal light reflection polarization maintaining optical fiber grating 412, a polarization maintaining doped fiber 413, an output coupling polarization maintaining optical fiber grating 414, and a pumping light detacher 415. The tail fiber of the semiconductor pumping source with tail fiber 4111 is fused with one end of the signal light reflection polarization maintaining optical fiber grating 4112, and the other end of the signal light reflection polarization maintaining optical fiber grating 412 is fused with one end of the polarization maintaining doped fiber 413, the other end of the polarization maintaining doped fiber 413 is fused with one end of the output coupling polarization maintaining optical fiber grating 414, the other end of the output coupling polarization maintaining optical fiber grating 414 is fused with one end of the pumping light detacher 415, the other end of the pumping light detacher 415 forms the output fiber 4116 of the linearly polarized optical fiber laser unit 410.

In the above-mentioned laser apparatus in which said laser is a linearly polarized laser 400, the polarizing beam splitter 10 in the laser anti-reflection device is made of a prism, and is a polarizing beam splitter transmitting P and reflecting S linearly polarized light. The $\lambda/4$ wave plate 20 is a reflective wave plate.

As shown in FIG. 7, the linearly polarized light beam emitted from the linearly polarized optical fiber laser 400 is collimated by an optical collimation system 70 before it enters the laser anti-reflection device, and then is focused by the focusing device 40 before it reaches the workpiece 200 to be processed. A part of light reflected from the workpiece 200 and returning along the original light path deviates from the outgoing light path of the laser due to the anti-reflection device, and reaches the absorber 30, which prevents the reflected light from damaging the laser 400. The working principle of said anti-reflection device is described before, and will not be repeated here.

Embodiment 8

Figure 8:
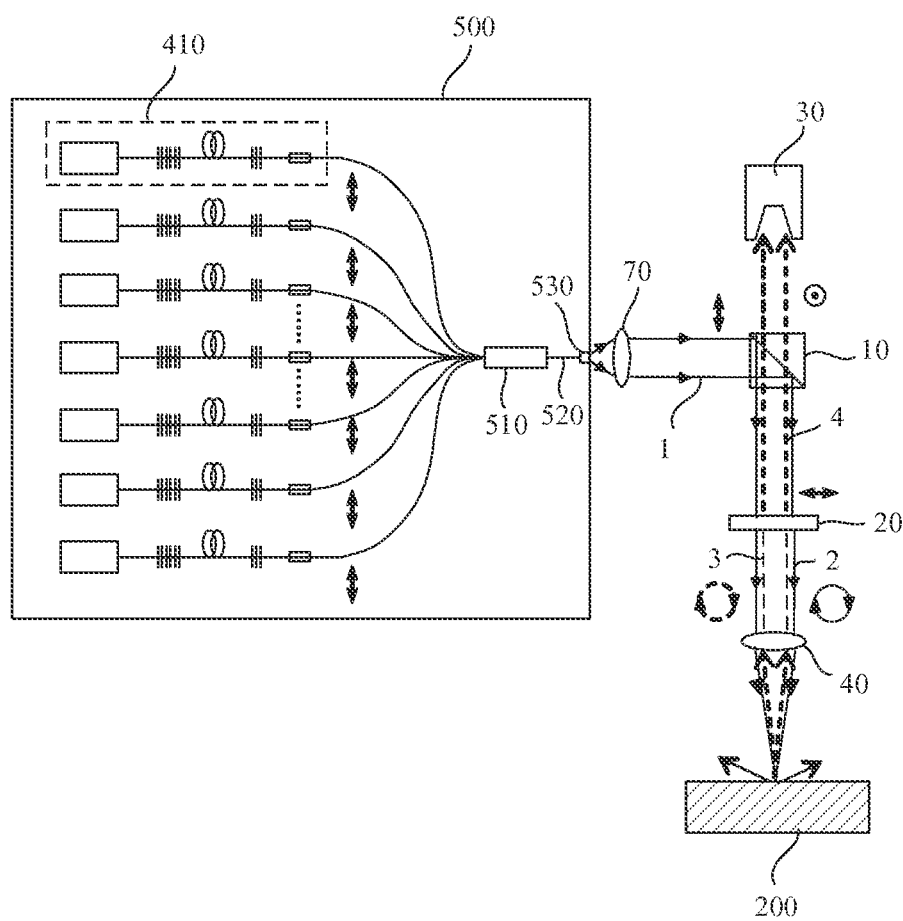
FIG. 8 is a schematic diagram showing the light path structure of a laser apparatus incorporating a laser anti-reflection device according to the eighth embodiment of the present invention.

FIG. 8 is a schematic diagram showing the light path structure of the laser apparatus incorporating the laser anti-reflection device according to the eighth embodiment of the present invention. In this embodiment, the laser apparatus incorporating the laser anti-reflection device includes: a polarization maintaining optical fiber laser 500 and a laser anti-reflection device as described above disposed in the outgoing light path of the laser.

As shown in FIG. 8, the polarization maintaining optical fiber laser 500 may include: a plurality of linearly polarized optical fiber laser units 410, a polarization maintaining optical fiber combiner 510, a large core diameter matching polarization maintaining optical fiber 520 and an optical fiber endcap 530. Output fibers of said plurality of linearly polarized optical fiber laser units 410 are combined together at one end of the polarization maintaining optical fiber combiner 510, the other end of the combiner 510 is fused with one end of the large core diameter matching polarization maintaining optical fiber 520, the other end of the fiber 520 is coupled with the fiber endcap 530. The polarization maintaining optical fiber combiner 510 may be a device formed by subjecting polarization maintaining optical fibers (not shown) that match the output fibers of the plurality of the linearly polarized optical fiber laser units 410 to a fused tapering process and then fusing them with the large core diameter matching polarization maintaining optical fiber 520.

In the above-mentioned laser apparatus in which said laser is a polarization maintaining optical fiber laser 500, the polarizing beam splitter 10 in the laser anti-reflection device is made of a prism, and is a polarizing beam splitter reflecting P and transmitting S linearly polarized light. The $\lambda/4$ wave plate 20 is a transmissive wave plate.

As shown in FIG. 8, the linearly polarized light beam emitted from the polarization maintaining optical fiber laser 500 is collimated by an optical collimation system 70 before it enters the laser anti-reflection device, and then is focused by the focusing device 40 before it reaches the workpiece 200 to be processed. A part of light reflected from the workpiece 200 and returning along the original light path deviates from the outgoing light path of the laser due to the anti-reflection device, and reaches the absorber 30, which prevents the reflected light from damaging the laser 500. The working principle of said anti-reflection device is described before, and will not be repeated here.

The above-mentioned polarization maintaining optical fiber laser 500 includes a plurality of linearly polarized optical fiber laser units 410, and each of the linearly polarized optical fiber laser units 410 is separated. Therefore, the damage to an individual unit 410 can only impose some influence on the total power of the final output of the laser, but will not impose a determinant influence on the output of the whole optical fiber laser. Thus, the above-mentioned polarization maintaining optical fiber laser with the anti-reflection device has high system stability.

In addition, the laser apparatus incorporating the anti-reflection device provided in another aspect of the present invention may include: a semiconductor laser or an array of semiconductor lasers and an aforementioned laser anti-reflection device disposed in the outgoing light path of the laser or the array of lasers. The detailed description thereof will not be provided here.

A laser apparatus incorporating the anti-reflection device, provided in yet another aspect of the present invention, will be described below with reference to FIG. 9.

Embodiment 9

Figure 9:
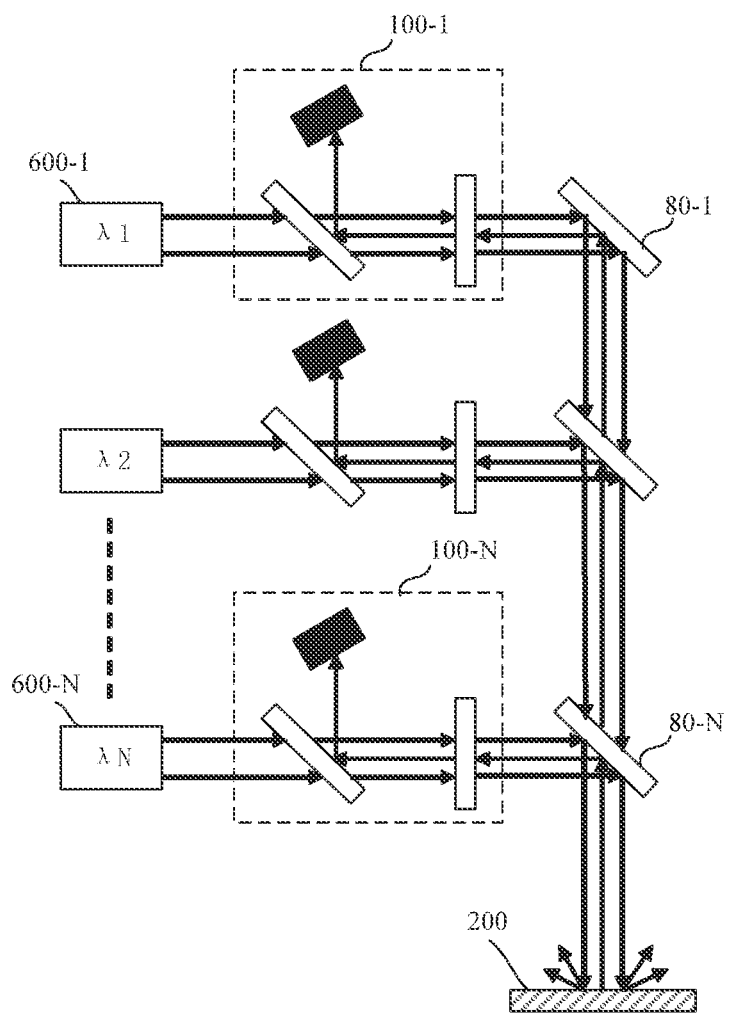
FIG. 9 is a schematic diagram showing the light path structure of a laser apparatus incorporating a laser anti-reflection device according to the ninth embodiment of the present invention.

FIG. 9 is a schematic diagram showing the light path structure of a laser apparatus incorporating a laser anti-reflection device according to the ninth embodiment of the present invention. As shown in FIG. 9, in this embodiment, the laser apparatus incorporating the anti-reflection device includes: N lasers 600-1~600-N, wherein N is a natural number, N≥2, and the $i^{th}$ laser emits linearly polarized light with a wavelength of $\lambda_i$, i being a natural number, 1≤i≤N; N aforementioned laser anti-reflection devices 100-1~100-N, wherein the $i^{th}$ laser anti-reflection device corresponds to the $i^{th}$ laser and is disposed in the outgoing light path of the laser; and N beam combiners 80-1~80-N, wherein the first beam combiner 80-1 corresponds to the first laser 600-1 and reflects or refracts light with a wavelength of $\lambda_1$; the $j^{th}$ beam combiner corresponds to the $j^{th}$ laser, j being a natural number, 2≤j≤N, the $j^{th}$ beam combiner reflects or refracts light with a wavelength of $\lambda_j$ and transmits light with a wavelength of $\lambda_i$, wherein 1≤i<j≤N. The linearly polarized light beams emitted from said N lasers 600-1~600-N pass their corresponding laser anti-reflection devices, respectively, and then pass their corresponding beam combiners, respectively before they are combined into one beam of light and reach the workpiece 200 to be processed.

The first beam combiner 80-1 in the above-mentioned embodiment may be omitted. If the first beam combiner 80-1 is omitted, and thus the first laser 600-1 corresponds to no beam combiner, then the linearly polarized light beam emitted from the first laser 600-1 passes its corresponding laser anti-reflection device 100-1 and directly merges into the light beams exiting from other lasers, passing their respective corresponding laser anti-reflection devices and their respective corresponding beam combiners to for one beam of light. Specifically, in FIG. 9, if there is no first beam combiner 80-1, then the branch light path constituted by the first laser 600-1 and the first laser anti-reflection device 100-1 may be clockwisely rotated 90°, so that the linearly polarized Hot beam emitted from the first laser 600-1 passes the laser anti-reflection device 100-1 and directly merges into the light beams exiting from other lasers, passing their respective corresponding laser anti-reflection devices and their respective corresponding beam combiners to form one beam of light.

The laser anti-reflection device and the laser apparatus incorporating the same according to the present invention have been described by way of example with reference to drawings. However, those skilled in the art should understand that various modifications may be made to the laser anti-reflection device and the laser apparatus incorporating the same according to the present invention without departing from the contents of the present invention. Therefore, the scope of the present invention should be defined by contents of the appended claims

The invention claimed is:
1. A laser anti-reflection device, comprising:
a polarizing beam splitter;
a $\lambda/4$ wave plate; and
an absorber, wherein:
said polarizing beam splitter and said $\lambda/4$ wave plate are configured to be disposed in the outgoing light path of a laser emitting a linearly polarized light beam with a wavelength of $\lambda$, such that the linearly polarized light beam exiting from the laser first passes the polarizing beam splitter, then passes the $\lambda/4$ wave plate and becomes a circularly polarized light beam,
when the circularly polarized light beam reaches a workpiece to be processed, a part of the circularly polarized light beam reflected from the workpiece returns along the original light path, passes the $\lambda/4$ wave plate and becomes a linearly polarized light beam with a polarization direction perpendicular to that of the outgoing linearly polarized light beam, and
the linearly polarized light beam deviates from the light path of the outgoing linearly polarized light beam after it passes the polarizing beam splitter and reaches the absorber.

2. The laser anti-reflection device of claim 1, wherein said polarizing beam splitter is a coated mirror or a prism.

3. The laser anti-reflection device of claim 1, wherein said polarizing beam splitter is a polarizing beam splitter transmitting P linearly polarized light and reflecting S linearly polarized light or a polarizing beam splitter transmitting S linearly polarized light and reflecting P linearly polarized light.

4. The laser anti-reflection device of claim 1, wherein said $\lambda/4$ wave plate is a transmissive $\lambda/4$ wave plate or a reflective $\lambda/4$ wave plate.

5. The laser anti-reflection device of claim 1, wherein said absorber is a perfect absorber for the linearly polarized light beam illuminating thereon with its light absorption surface forming an arbitrary angle with the linearly polarized light beam, or said absorber is a partial absorber for said linearly polarized light beam illuminating thereon with its light absorption surface forming a non-right angle with the linearly polarized light beam.

6. A laser apparatus incorporating an anti-reflection device, comprising:
   a laser and a laser anti-reflection device of claim 1,
   wherein said laser anti-reflection device is disposed in the outgoing light path of said laser for separating the laser beam returning to said laser along the original path due to workpiece reflection during workpiece processing.

7. The laser apparatus incorporating an anti-reflection device of claim 6, further comprising:
   one or more systems of an optical collimation system disposed between said laser and said laser anti-reflection device;
   an optical focusing system disposed between said laser anti-reflection device and said workpiece to be processed; and
   at least one reflection or refraction systems disposed between said laser and said workpiece to be processed.

8. The laser apparatus incorporating an anti-reflection device of claim 6, wherein said laser is a $CO_2$ laser.

9. The laser apparatus incorporating an anti-reflection device of claim 8, wherein said polarizing beam splitter is a coated mirror in which a polarization light splitting film is coated on a ZnSe or GaAs substrate.

10. The laser apparatus incorporating an anti-reflection device of claim 8, wherein said $\lambda/4$ wave plate is a bronze mirror plated with a $\lambda/4$ retardation film.

11. The laser apparatus incorporating an anti-reflection device of claim 10, wherein said bronze mirror plated with a $\lambda/4$ retardation film is provided with a cooling water pipe.

12. The laser apparatus incorporating an anti-reflection device of claim 6, wherein said laser is a linearly polarized optical fiber laser comprising a linearly polarized optical fiber laser unit and an optical fiber end cap coupled with the output fiber of the linearly polarized optical fiber laser unit.

13. The laser apparatus incorporating an anti-reflection device of claim 12, wherein said linearly polarized optical fiber laser unit comprises:
   a semiconductor pumping source with tail fiber;
   a signal light reflection polarization maintaining optical fiber grating;
   a polarization maintaining doped fiber;
   an output coupling polarization maintaining optical fiber grating; and
   a pump light detacher, wherein:
   the tail fiber of said semiconductor pumping source with tail fiber is fused with one end of said signal light reflection polarization maintaining optical fiber grating,
   the other end of said signal light reflection polarization maintaining optical fiber grating is fused with one end of said polarization maintaining doped fiber,
   the other end of said polarization maintaining doped fiber is fused with one end of said output coupling polarization maintaining optical fiber grating, and
   the other end of said output coupling polarization maintaining optical fiber grating is fused with one end of said pumping light detacher and the other end of said pumping light detacher forms the output fiber of said linearly polarized optical fiber laser unit.

14. The laser apparatus incorporating an anti-reflection device of claim 6, wherein said laser is a polarization maintaining optical fiber laser comprising:
   a plurality of linearly polarized optical fiber laser units;
   a polarization maintaining optical fiber combiner; and
   a large core diameter matching polarization maintaining optical fiber and a fiber end cap, wherein:
   the output fibers of said plurality of linearly polarized optical fiber laser units are combined together at one end of the polarization maintaining optical fiber combiner,
   the other end of the polarization maintaining optical fiber combiner is fused with one end of the large core diameter matching polarization maintaining optical fiber, and
   the other end of the large core diameter matching polarization maintaining optical fiber is coupled with the fiber end cap.

15. The laser apparatus incorporating an anti-reflection device of claim 6, wherein said laser is a semiconductor laser or an array of semiconductor lasers.

16. A laser apparatus incorporating an anti-reflection device, comprising:
   N lasers, where N is a natural number, N≥2, and the $i^{th}$ laser emits linearly polarized light with a wavelength of $\lambda_i$, i being a natural number, $1 \geq i \geq N$;
   N laser anti-reflection devices of claim 1, where the $i^{th}$ laser anti-reflection device corresponds to the $i^{th}$ laser and is disposed in the outgoing light path of the laser; and
   at least N−1 beam combiners, where the $j^{th}$ beam combiner corresponds to the $j^{th}$ laser, j being a natural number, $2 \leq j \leq N$, the $j^{th}$ beam combiner reflects or refracts light with a wavelength of $\lambda_j$ and transmits light with a wavelength of $\lambda_i$, where $1 \leq i < j \leq N$, wherein:
   the linearly polarized light beams emitted from said N lasers pass their corresponding laser anti-reflection devices, respectively, and then pass their corresponding beam combiners, respectively, before they are combined into one beam of light and reach the workpiece to be processed, and
   if the first laser corresponds to no beam combiner, then the linearly polarized light beam emitted from the first laser passes its corresponding laser anti-reflection device and directly merges into the light beams exiting from other lasers, passing their respective corresponding laser anti-reflection devices and their respective corresponding beam combiners to form one beam of light.

17. The laser apparatus incorporating an anti-reflection device of claim 16, further comprising a first beam combiner corresponding to said first laser and reflecting or refracting light with a wavelength of $\lambda_1$.

18. The laser apparatus incorporating an anti-reflection device of claim 6, wherein said polarizing beam splitter is a coated mirror or a prism.

19. The laser apparatus incorporating an anti-reflection device of claim 6, wherein said polarizing beam splitter is a polarizing beam splitter transmitting P linearly polarized light and reflecting S linearly polarized light or a polarizing beam splitter transmitting S linearly polarized light and reflecting P linearly polarized light.

20. The laser apparatus incorporating an anti-reflection device of claim 6, wherein said $\lambda/4$ wave plate is a transmissive $\lambda/4$ wave plate or a reflective $\lambda/4$ wave plate.

21. The laser apparatus incorporating an anti-reflection device of claim 6, wherein said absorber is a perfect absorber for the linearly polarized light beam illuminating thereon with its light absorption surface forming an arbitrary angle with the linearly polarized light beam, or said absorber is a partial absorber for said linearly polarized light beam illuminating thereon with its light absorption surface forming a non-right angle with the linearly polarized light beam.

* * * * *